United States Patent
Chun (10) Patent No.: US 7,787,895 B2
(45) Date of Patent: Aug. 31, 2010

(54) METHOD FOR TRANSMITTING MESSAGE IN MOBILE NETWORK AND MOBILE TERMINAL

(75) Inventor: Eun-Mi Chun, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 746 days.

(21) Appl. No.: 11/602,341

(22) Filed: Nov. 21, 2006

(65) Prior Publication Data

US 2007/0129091 A1 Jun. 7, 2007

(30) Foreign Application Priority Data

Nov. 23, 2005 (KR) ...................... 10-2005-0112583

(51) Int. Cl.
  H04M 3/00 (2006.01)
  H04M 1/00 (2006.01)
  H04W 72/00 (2009.01)
  H04W 4/00 (2009.01)
(52) U.S. Cl. .................... 455/466; 455/418; 455/452.2; 455/550.1; 455/556.2; 455/561
(58) Field of Classification Search .................. 455/70, 455/412.1, 419, 466, 512–514, 517, 521, 455/550.1, 556.2, 67.13, 90.1, 135, 161.3, 455/166.2, 277.2, 418, 452.1–452.2, 557–558, 455/566; 370/395.3, 395.31, 207, 310, 313, 370/328, 395.21, 395.4–395.43, 395.52, 370/395.71, 412–413, 429, 912; 709/206–207, 709/240, 202–203, 215, 221, 228
See application file for complete search history.

(56) References Cited

U.S. PATENT DOCUMENTS

| 6,108,316 | A  | * | 8/2000 | Agrawal et al. ............. 370/311 |
| 6,801,786 | B1 | * | 10/2004 | Korpela ................... 455/552.1 |
| 7,339,893 | B2 | * | 3/2008 | Regal et al. ................. 370/235 |
| 2002/0137500 | A1 | * | 9/2002 | Brooking et al. ............ 455/419 |
| 2003/0009580 | A1 | * | 1/2003 | Chen et al. .................. 709/231 |
| 2003/0186724 | A1 | * | 10/2003 | Tsutsumi et al. ............ 455/561 |
| 2004/0185883 | A1 | * | 9/2004 | Rukman ..................... 455/466 |
| 2004/0242202 | A1 | * | 12/2004 | Torvinen ................. 455/412.1 |
| 2005/0147056 | A1 | * | 7/2005 | Chinitz ....................... 370/310 |
| 2005/0152401 | A1 | * | 7/2005 | Wiljakka et al. ............ 370/474 |
| 2005/0169191 | A1 | * | 8/2005 | Cheong et al. .............. 370/252 |
| 2005/0191996 | A1 | * | 9/2005 | Cha .......................... 455/418 |
| 2005/0248437 | A1 | * | 11/2005 | Hellebust et al. ........... 340/7.51 |
| 2008/0293444 | A1 | * | 11/2008 | Furuskar et al. ............. 455/522 |

FOREIGN PATENT DOCUMENTS

KR    10-0202130 B1    6/1999

* cited by examiner

*Primary Examiner*—Meless N Zewdu
(74) *Attorney, Agent, or Firm*—Birch, Stewart, Kolasch & Birch, LLP

(57) ABSTRACT

A method and mobile terminal for efficiently transmitting a message, are provided. According to an embodiment, the method includes receiving a request for transmission of a message; if there is other data being transmitted or to be transmitted, setting in the mobile terminal a priority of transmission of the requested message to a level higher than a priority of transmission of the data; and transmitting the message according to the set priority of the transmission of the message.

20 Claims, 6 Drawing Sheets

METHOD FOR TRANSMITTING MESSAGE IN MOBILE NETWORK AND MOBILE TERMINAL

The present application claims priority to Korean Patent Application No. 10-2005-0112583, filed in Korea on Nov. 23, 2005, the entire contents of which are hereby incorporated by reference in its entirety.

BACKGROUND OF THE INVENTION

1. Field of the Invention

The present invention relates to a method for transmitting a message, and more particularly to, a mobile terminal and method for sending a message first before the transmission of other data, so as to successfully transmit the message.

2. Description of the Related Art

Since the development of the second generation communication technologies, service providers have attempted to provide a data transmission/reception service using a wireless network. As part of this attempt, a GPRS (General Packet Radio Service) network has been suggested. Such a GPRS provides access to the internet network and offers various services, for example, web. browsing, email, etc., via a wireless communication system.

Hereinafter, the configuration of a GPRS network providing various types of services as listed above will be described with reference to FIGS. 1a and 1b according to the related art.

Figure 1:
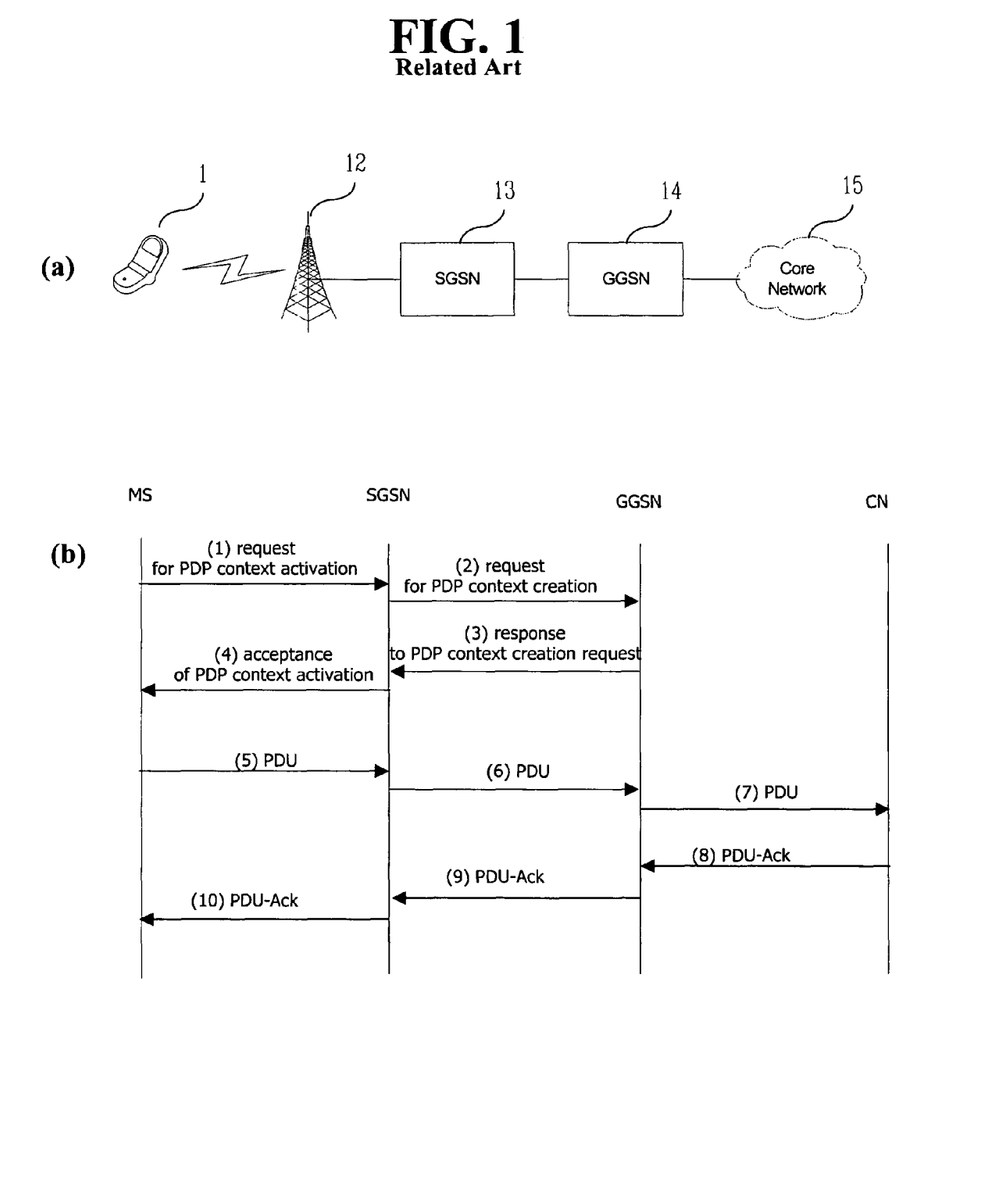
FIG. 1a is a block diagram of a mobile network according to a related art.
FIG. 1b is a flow chart for transmitting/receiving data over the mobile network of FIG. 1a according to a related art.

FIG. 1a is a block diagram of a mobile communication network according to the related art.

Referring to FIG. 1a, the mobile communication network comprises: a mobile terminal 1, a base station 12, a serving GPRS support node (SGSN) 13, a gateway GPRS support node (GGSN) 14, and a core network (CN) 15. The GGSN 14 is connected to the core network 15 such as the internet, and the SGSN 13 serves to forward a packet transmitted by the mobile terminal 1 to the GGSN 14 so as to allow it to reach the core network 15.

FIG. 1b is a flow chart for transmitting/receiving data over the mobile communication network of FIG. 1a according to the related art.

As can be seen from FIG. 1b, the transmission of a packet is performed through a PDP (Packet Data Protocol) context setup. This will be described in more detail below.

First, (1) the mobile terminal 1 sends a "PDP context activation request" message to the SGSN 13, e.g., through the base station 12. The message contains NASAPI (Network Service Access Point Identifier), QoS (Quality of Service), PDP address, and the like. The NSAPI indicates a specific service of the mobile terminal 1 that wants to use the GPRS, and the QoS indicates how the mobile terminal 1 manages sessions. The PDP address may be an internet protocol address (IP Address).

Next, (2) the SGSN 13 sends a "PDP context creation request" message to the GGSN 14. The message contains the PDP address, SGSN address, and QoS.

Then, (3) the GGSN 14 returns a PDP context creation response to the SGSN 13. The returned response contains the GGSN address, IP address, QoS, and the like.

Then, (4) the SGSN 13 sends a "PDP context activation accept" message. The message contains the PDP address, processed QoS, and the like.

Then, the mobile terminal 1 is able to send packet data, which is successfully accomplished by sending packet data (Packet Data Unit—PD) to the core network 15 as in (5)-(7) and receiving a response (PDU-Ack) thereto as in (8)-(10).

The mobile terminal 1 is able to perform packet communication through the procedure described up to this point. Services using such packet communication include a short message service (SMS), a multimedia message service (MMS), other data transmission/reception services, and the like. Among them, the short message service (SMS) is a service for sending relatively short data over a mobile network, and the multimedia message service (MMS) is a service for sending large messages, such as multimedia, by supplementing the SMS.

However, when the mobile terminal 1 tries to send or receive a short message or multimedia message along with other data via such a related art GPRS network, the short message or multimedia message is not normally sent or received due to a delay and other problems.

SUMMARY OF THE INVENTION

Therefore, an object of the present invention is to provide a mobile terminal and method for sending a message first before other data, to successfully transmit the message.

Another object of the present invention is to provide a method and mobile terminal for transmitting a message, which address the limitations and disadvantages associated with the related art.

To achieve the aforementioned and other objects, there is provided a method for transmitting a message in a mobile terminal in accordance with an aspect of the present invention, including: receiving a request for transmission of a message; if there is any other data being transmitted or to be transmitted, setting the priority of transmission of the requested message to a higher level than the other data; and sending the message first.

Additionally, there is provided a method for transmitting a message in a mobile terminal in accordance with another aspect of the present invention, including: receiving a request for transmission of data; establishing communication and a QoS agreement in response to the request; sending the data according to the agreed QoS; receiving a request for transmission of a message during the transmission of the data; setting the QoS of the requested message to a higher level than the agreed QoS; and sending the message first.

On the other hand, to achieve the aforementioned and other objects, there is provided a mobile terminal in accordance with another aspect of the present invention, including: a transmission/reception unit; and a controller for controlling the transmission/reception unit so as to send a message first if data and the message need to be sent.

Additionally, there is provided a mobile terminal in accordance with another aspect of the present invention, including: a transmission/reception unit; a buffer for temporarily storing a message and data before being sent through the transmission/reception unit; and a controller for controlling the transmission/reception unit and the buffer so as to send the message first before the data stored in the buffer.

According to another aspect of the present invention, there is provided a method for transmitting a message using a mobile terminal, comprising: receiving a request for transmission of a message; if there is other data being transmitted or to be transmitted, setting in the mobile terminal a priority of transmission of the requested message to a level higher than a priority of transmission of the data; and transmitting the message according to the set priority of the transmission of the message.

According to another aspect of the present invention, there is provided a method for transmitting a message using a mobile terminal, comprising: receiving a request for transmission of data; establishing communication and a QoS (Quality of Service) agreement in response to the request; sending the data according to the agreed QoS; receiving a request for transmission of a message during the transmission of the data; setting a QoS of the requested message to a higher level than the agreed QoS; and sending the message first based on the set QoS of the message.

According to another aspect of the present invention, there is provided a mobile terminal, comprising: a transmission/reception unit; and a controller configured to control the transmission/reception unit so as to send a message first, if both data and the message need to be sent.

According to another aspect of the present invention, there is provided a mobile terminal, comprising: a transmission/reception unit; a buffer configured to temporarily store a message and data before being sent through the transmission/reception unit; and a controller configured to control the transmission/reception unit and the buffer so as to send the message first before a transmission of the data stored in the buffer.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Hereinafter, prior to the description of the preferred embodiments of the present invention, a general procedure performed to send a message and data in a mobile terminal will be described in order to help understanding of the invention.

Figure 2A:
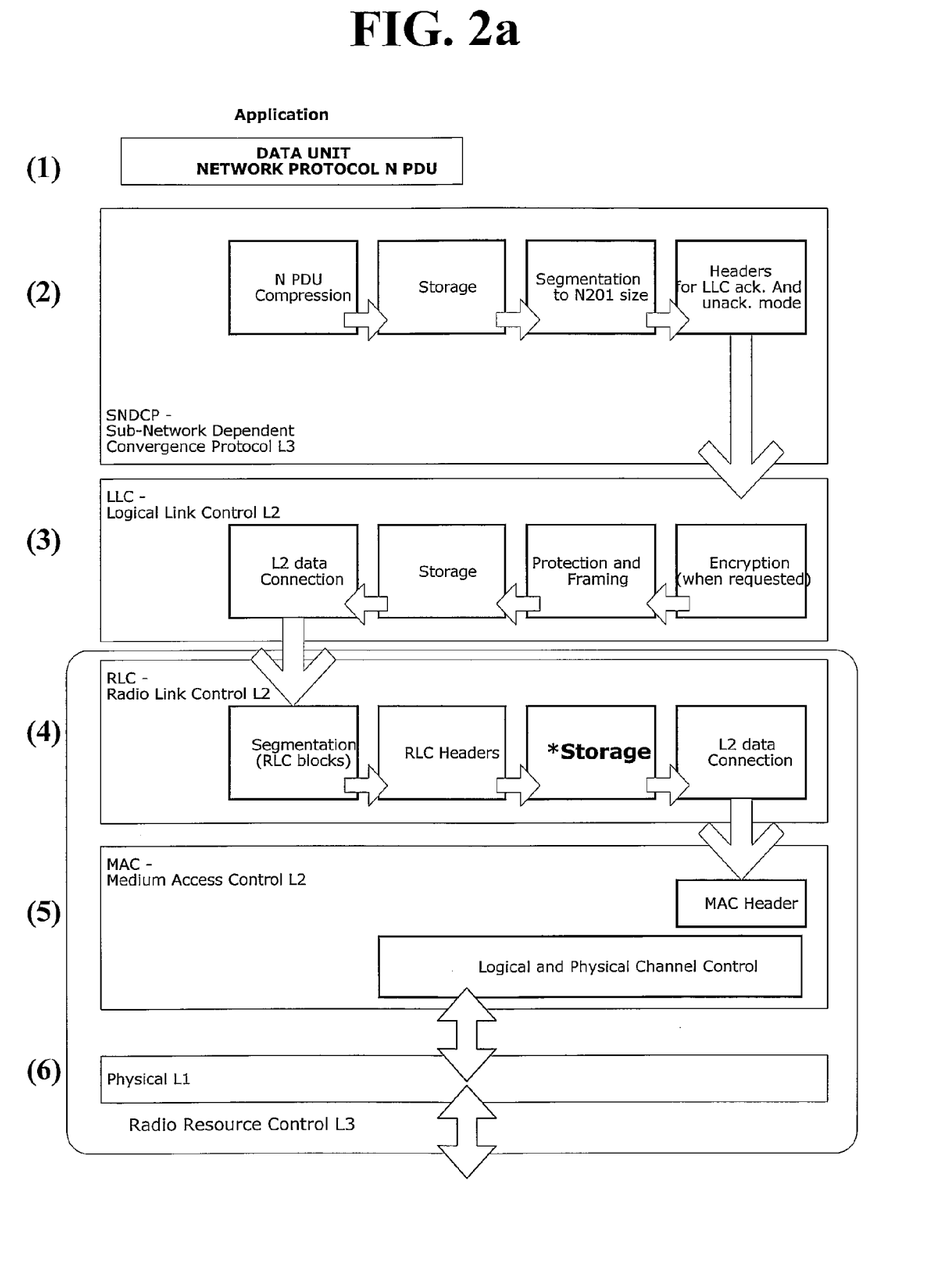
FIG. 2a is a flow chart showing a procedure performed in a mobile terminal for data transmission.

FIG. 2a is a flow chart showing a procedure performed in a mobile terminal for data transmission. The layers shown are implemented in the mobile terminal.

As shown therein, first, (1) data is created by a certain service of an application layer, and delivered to a SNDCP (Sub-Network Dependent Convergence Protocol) layer corresponding to the third layer. Next, (2) the SNDCP layer compresses the delivered data, stores them in a storage area, segmented into packets, attaches a header to the packets, and forwards them to a LLC (Logical Link Control) corresponding to the second layer. (3) The LLC encodes the packets received from the SNDCP layer as needed, temporally stores them, and then delivers them to a RLC (Radio Link Control) layer. Then, (4) the RLC layer segments the packets received from the LLC into RLC blocks, attaches a header to the blocks, and stores them in the storage area. Continuously, the blocks are delivered to a MAC (Medium Access Control) layer. (5) The MAC layer attaches a header to the delivered blocks, and thereafter delivers them to a physical layer corresponding to the first layer, thereby (6) transmitting them via a wireless network. So far, the method of encoding general data created by a given service of the mobile terminal has been described.

Figure 2B:
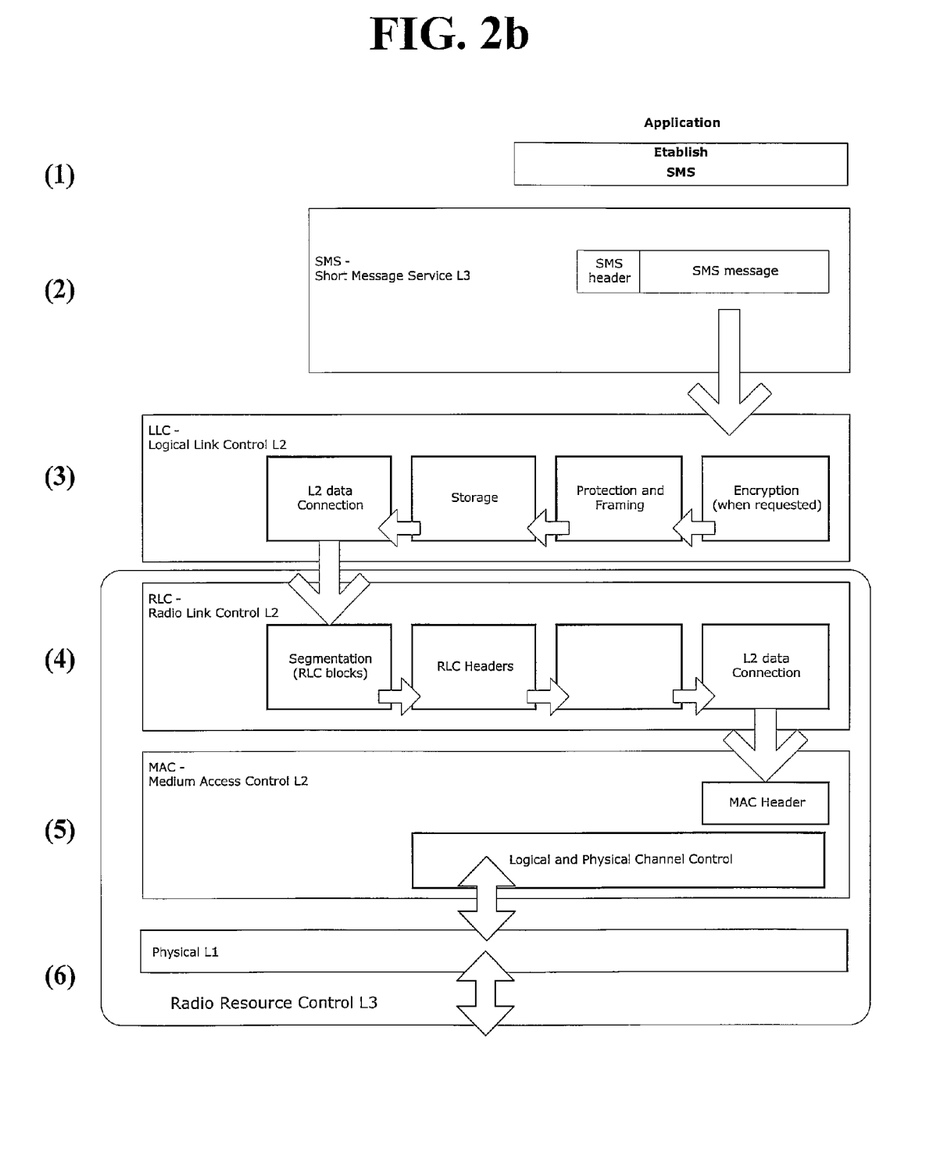
FIG. 2b is a flow chart showing a procedure performed in a mobile terminal for message transmission.

FIG. 2b is a flow chart showing a procedure performed in the mobile terminal for message transmission.

As shown in FIG. 2b, first, (1) a message is created by a message service (e.g., a SMS as shown in the drawing) of an application layer, and delivered to a SMS layer corresponding to the third layer. Next, (2) the third layer attaches a header to the message, and delivers it in a packet to the LLC (Logical Link Control) corresponding to the second layer. (3) The LLC encodes the packet received from the third layer as needed, temporarily stores it, and delivers it to the RLC (Radio Link Control) layer. Then, (4) the RLC layer segments the delivered packet into RLC blocks, attaches a header thereto, and stores it in the storage area of the RLC layer. Continuously, the RLC blocks are delivered to the MAC (Medium Access Control) layer. (5) The MAC layer attaches a header to the delivered blocks, and thereafter delivers them to a physical layer corresponding to the first layer, thereby (6) transmitting them via a wireless network.

As can be seen from FIGS. 2a and 2b, the data created by the certain service of the application layer in FIG. 2a and the message created by the message service in FIG. 2b are stored together in the storage area of the RLC layer. Therefore, the present inventor has discovered that if a large volume of data is present in the storage area of the RLC layer, along with a message, this message may not be transmitted and received successfully.

Figure 3:
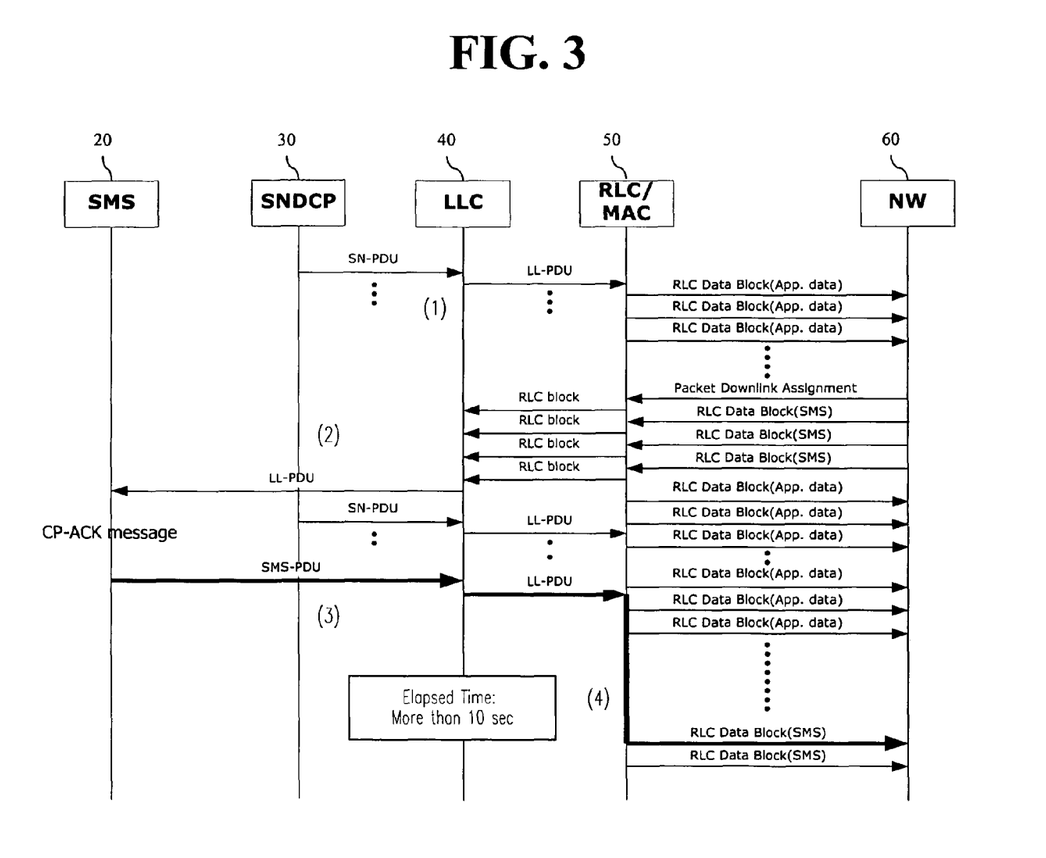
FIG. 3 is a flow chart showing a procedure in which data and a message are sent according to FIGS. 2a and 2b.

FIG. 3 is a flow chart showing an example of a procedure in which data and a message are sent according to FIGS. 2a and 2b.

As can be seen from FIG. 3, (1) a large volume of data is created by a certain service of a mobile terminal, delivered to a SNDCP layer 30, and sent to a network 60 in RLC data blocks via an RLC/MAC layer 50. Accordingly, the network 60 processes the RLC data blocks received from the mobile terminal. However, (2) if there arises a situation in which the network 60 has to send a message to the mobile terminal, the network 60 sends the message to the mobile terminal in RLC data blocks. Then, in the mobile terminal, the received RLC data blocks are delivered to a message service (e.g., an SMS layer 20) via the RLC/MAC layer 50 and the LLC layer 50. (3) The message service forms an ACK message in order to transmit a response acknowledging receipt of the message to the network 60, and delivers it to the RLC layer 50 via the LLC layer 40. However, as described above, the RLC layer 50 that has received the ACK message has a large amount of data to be transmitted to the network 60, thus failing to transmit the ACK message successfully. Since the ACK message cannot be transmitted to the network 60, the network 60 then determines that the mobile terminal has not received the message, and re-transmits the message.

Hereinafter, the present invention, which addresses these limitations, will be described in detail with reference to the accompanying drawings.

Figure 4:
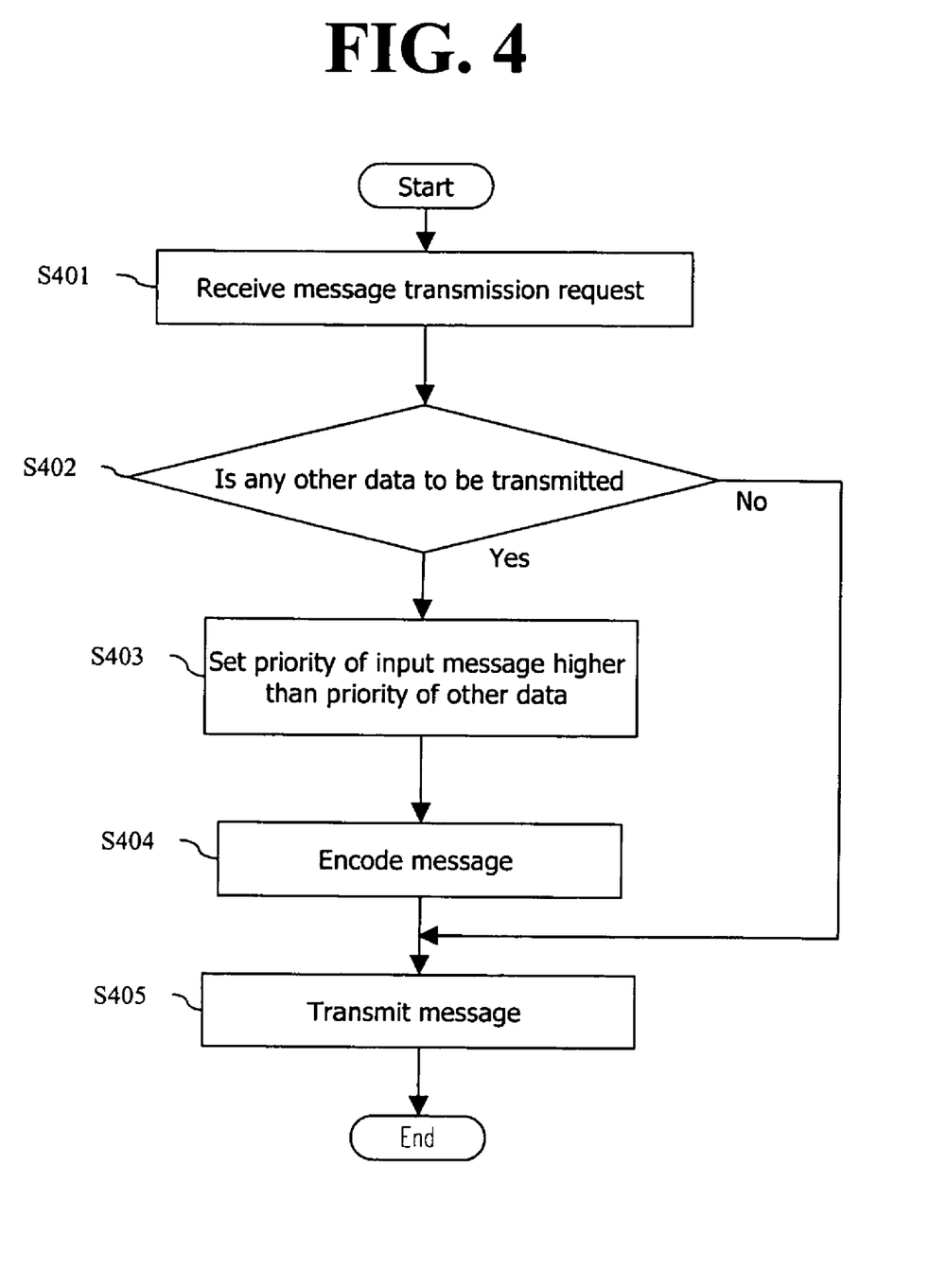
FIG. 4 is a message transmission flow chart in accordance with one embodiment of the present invention.

FIG. 4 is a flow chart illustrating a method of transmitting a message in a mobile communication system in accordance with one embodiment of the present invention. This method can be implemented in the system of FIG. 3, but can be implemented in other suitable system.

As shown therein, first, a request for transmission of a message is received (S401). For instance, the network 60 sends the message transmission request to the message service of a mobile terminal, or the mobile terminal sends the message transmission request to the network 60, depending on which entity desires to send the message. Here, the message may be a SMS (short message), a MMS (multimedia message), or an EMS (enhanced multimedia message). Next, it is determined whether or not any other data to be transmitted exists (S402). For instance, the mobile terminal determines if there exists data to be transmitted to the network 60.

If the result of the determination at step S402 is "No", the requested message is directly sent (S405). For instance, the network or mobile terminal sends the message to the other entity via the known procedures, and the message receiving entity can send an acknowledgement signal that acknowledges the receipt of the message.

However, if the result of the determination at step S402 is "Yes", the priority of the transmission of the message is set to a high level (S403). For instance, the mobile terminal can set the message transmission priority to be higher than the data transmission priority, so that the message can be sent first before the transmission of the data to ensure successful transmission of the message. Accordingly, the message is encoded using the known techniques (S404), and the message is sent to the network (or to the mobile terminal) according to the set priority setting (S405).

The priority setting at step S403 may involve setting the priority of transmission of the message higher than the priority of transmission of the other data, preferably, one or more levels higher than the priority of transmission of the other data. Also, this priority setting may involve setting the transmission of the message to the highest priority level.

The priorities of the transmission of data and message may depend on a radio priority and/or QoS (Quality of Service) set at the time of the PDP context activation described above. For instance, the above priority setting (at step S403) may involve setting the priority of the transmission of the message to be a value higher than the radio priority and/or QoS value set at the time of the PDP context activation. On the other hand, the priority of the transmission of the data may correspond to the radio priority and/or QoS value set at the time of the PDP context activation. Here, the higher priority value set for the message transmission in step S403 may be a value one or more levels higher than the radio priority and/or QoS value set at the time of the PDP context activation. A further description thereof will be provided below with reference to the following tables.

TABLE 1

| | | Value set at the time of PDP context activation |
|---|---|---|
| Radio Priority | | 0x3 |
| QoS | Delay | 0x0 |
| | Reliability | 0x0 |
| | Peak | 0x0 |
| | Precedence | 0x3 |
| | Mean | 0x0 |

Table 1 shows an example of a radio priority and QoS set at the time of PDP context activation in the mobile terminal/system. The components of the QoS include delay, reliability, peak, precedence and mean. Here, the precedence is used to determine the order of packets to be discarded when there is a disorder in the network. Examples of a list of possible values that can be set for these components are as follows.

Radio Priority
(0x0): Radio Priority Level 1 (highest)
(0x1): Radio Priority Level 2
(0x2): Radio Priority Level 3
(0x3): Radio Priority Level 4 (lowest)
Delay
(0x1): Delay class 1
(0x2): Delay class 2
(0x3): Delay class 3
(0x4): Delay class 4 (best effort)(highest)
(0x7): Reserved
(0x0): Delay class 4 (lowest)
Reliability
(0x1): Acknowledged GTP, LLC, and RLC; Protected data (highest)
(0x2): Unacknowledged GTP; Acknowledged LLC and RLC, Protected data
(0x3): Unacknowledged GTP and LLC; Acknowledged RLC, Protected data
(0x4): Unacknowledged GTP, LLC, and RLC, Protected data
(0x5): Unacknowledged GTP, LLC, and RLC, Unprotected data (lowest)
(0x7): Reserved
(0x0): Unacknowledged GTP and LLC; Acknowledged RLC, Protected data
Peak Throughput
(0x1): Up to 1000 octet/s
(0x2): Up to 2000 octet/s
(0x3): Up to 4000 octet/s
(0x4): Up to 8000 octet/s
(0x5): Up to 16000 octet/s
(0x6): Up to 32000 octet/s
(0x7): Up to 64000 octet/s
(0x8): Up to 128000 octet/s
(0x9): Up to 256000 octet/s (highest)
(0xf): Reserved
(0x0): Up to 1000 octet/s (lowest)
Precedence
(0x1): High priority (highest)
(0x2): Normal Priority
(0x3): Low priority
(0x7): Reserved
(0x0): Normal Priority (lowest)
Mean Throughput
(0x0): Subscribed mean throughput (uplink only)
(0x1): 100 octet/h (lowest)
(0x2): 200 octet/h
(0x3): 500 octet/h
(0x4): 1000 octet/h
(0x5): 2000 octet/h
(0x6): 5000 octet/h
(0x7): 10000 octet/h
(0x8): 20000 octet/h
(0x9): 50000 octet/h
(0xa): 100000 octet/h
(0xb): 200000 octet/h
(0xc): 500000 octet/h
(0xd): 1000000 octet/h
(0xe): 2000000 octet/h (0xf): 5000000 octet/h
(0x10): 10000000 octet/h
(0x11): 20000000 octet/h
(0x12): 50000000 octet/h
(0x1e): Reserved
(0x1f): Best effort (highest)

Having described the possible values that can be set for the radio priority and QoS above, hereinafter, an example of setting values higher than the values set (in the example of Table 1) at the time of PDP context activation in accordance with the present invention will be described.

TABLE 2

| | | Values in accordance with one example of the present invention |
|---|---|---|
| Radio Priority | | 0x2 |
| QoS | Delay | 0x1 |
| | Reliability | 0x1 |
| | Peak | 0x1 |
| | Precedence | 0x1 |
| | Mean | 0x1 |

As can be seen from the example of Table 2, the values, which are one level higher than the values set at the time of PDP context activation as illustrated in Table 1, are set in accordance with one embodiment of the present invention. Therefore, the values as shown in Table 2 are set for the transmission priority of a message (i.e., according to Table 2), and the values set at the time of PDP context activation are used for the transmission priority of data (i.e., according to Table 1), so that the message can be transmitted first before the data according to the present invention.

TABLE 3

| | | Values in accordance with another example of the present invention |
|---|---|---|
| Radio Priority | | 0x0 |
| QoS | Delay | 0x4 |
| | Reliability | 0x1 |
| | Peak | 0x9 |
| | Precedence | 0x1 |
| | Mean | 0x1f |

As can be seen from another example, Table 3, the highest values are set among the values that can be set for the components in accordance with one embodiment of the present invention. Accordingly, in this example, the highest values are set for the transmission priority of a message (i.e., according to Table 3), and the values set at the time of PDP context activation are used for the transmission priority of data (i.e., according to Table 1), so that the message can be transmitted first before the data according to the present invention.

The method described herein in accordance with the present invention can be implemented by software, hardware, or a combination thereof. For instance, the method of FIG. 4 in accordance with the present invention can be implemented by codes or commands in a software program that can be stored in a storage medium (e.g., an internal memory of the mobile terminal, a flash memory, a hard disk, or the like) and executed by a processor (e.g., a microprocessor in the mobile terminal).

Figure 5:
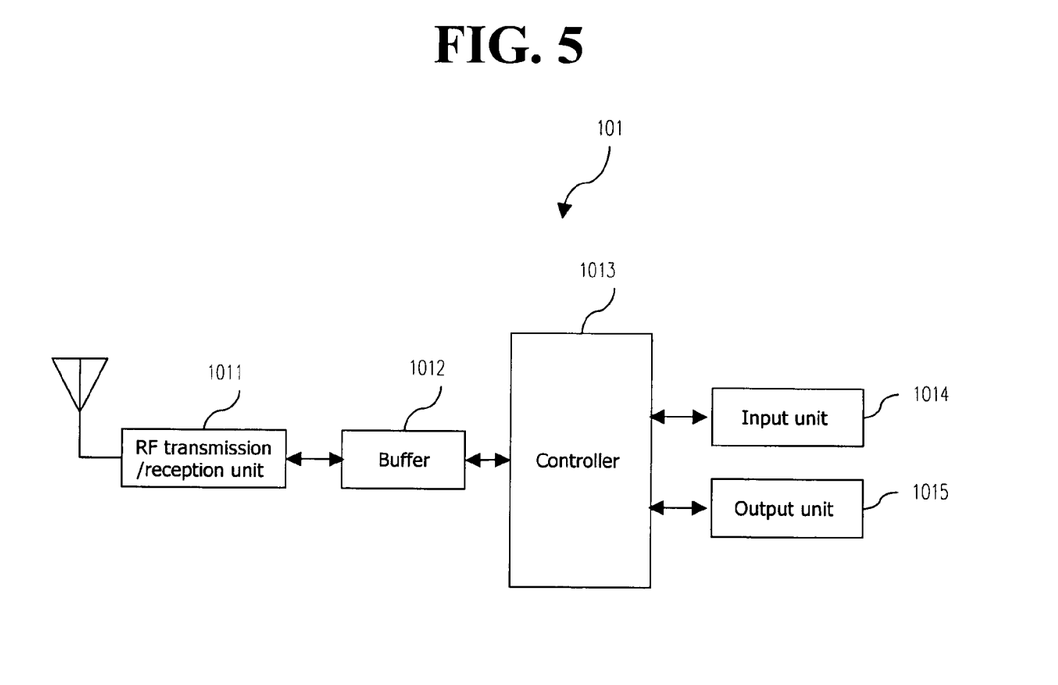
FIG. 5 is a block diagram of a mobile terminal in accordance with one embodiment of the present invention.

FIG. 5 is a block diagram of a mobile terminal in accordance with one embodiment of the present invention. The methods of the present invention, e.g., the method of FIG. 4, can be implemented in the mobile terminal of FIG. 5.

As shown in FIG. 5, the mobile terminal 101 in accordance with the present invention comprises a RF transmission/reception unit 1011, a buffer or storage unit 1012, a controller 1013, an input unit 1014, and an output unit 1015. The buffer 1012 is a place for storing temporarily data and messages to be transmitted. All the components of the mobile terminal 101 and the components of other entities (e.g., the network) in communication with the mobile terminal, are operatively coupled and configured.

When the controller 1013 receives a message transmission command (e.g., from the network 60) during a data transmission, the controller 1013 ensures successful transmission of the message by setting the priority of the transmission of the message to a high or higher level. Here, this priority setting may involve, as stated earlier, setting the priority of the transmission of the message higher than the priority of the transmission of the data, preferably, one level or two or more levels higher than the priority of transmission of the data. Also, this priority setting may involve setting the priority of the transmission of the message to the highest priority level.

Meanwhile, as stated earlier, the priority may depend on a radio priority and/or QoS (Quality of Service) set at the time of the PDP context activation described above. Accordingly, the above priority setting may involve setting the priority of the transmission of the message to a value that is higher than the radio priority and/or QoS value set at the time of the PDP context activation. Here, the higher value may be a value one or more levels higher than the radio priority and/or QoS value set at the time of the PDP context activation, or may be the highest value among the possible values for the radio priority and/or QoS value.

According to the present invention, the message can be, but is not limited to, a SMS (Short Message Service), an EMS (Enhanced Message Service), or a MMS (Multimedia Message Service). Also the message can be a message created by a user of the mobile terminal, or an acknowledgement message.

As seen from above, in accordance with the present invention, it is possible to prevent a transmission failure problem at the time of a message transmission, which may occur when the transmission of the message is delayed or fails because the amount of data being transmitted previously is large. Further, in accordance with the present invention, even if the amount of data being transmitted previously is not large, when a message needs to be urgently transmitted according to a user's need, this can be handled successfully.

While the preferred embodiments have been described for illustration, the scope of the present invention is not limited to the specific embodiments, and it will be appreciated that various modifications, alterations and improvements may be made to the preferred embodiments described above without departing from the scope and spirit of the present invention.

What is claimed is:

1. A method for transmitting a message using a mobile terminal, the method comprising:

receiving, by a controller in the mobile terminal, a request for transmission of packets of a message;

determining, by the controller, whether packets of data other than the packets of the message to be transmitted exist in a buffer;

setting, by the controller, a radio priority and a QoS (Quality of Service) associated with transmission of the packets of the message to a level higher than a radio priority and a QoS associated with transmission of the packets of data other than the packets of the message based on a determination that the packets of data other than the packets of the message exist in the buffer such that the packets of the message are transmitted before transmission of the packets of data existing in the buffer;

temporarily storing, by the controller, the packets of the message to be transmitted in the buffer; and transmitting to a base station, by a transmission unit in the mobile terminal, the packets of the message existing in the buffer prior to transmitting the packets of data other than the packets of the message according to the radio priority and the QoS.

2. The method of claim 1, wherein the message is a SMS (Short Message Service), an EMS (Enhanced Message Service), or a MMS (Multimedia Message Service).

3. The method of claim 1, wherein the message is a message created by a user of the mobile terminal, or an acknowledgement message.

4. The method of claim 1, wherein in the setting step, the radio priority and the QoS of the transmission of the packets of the message are set to be at least one level higher than the radio priority and the QoS of the transmission of the packets of the data, or are set to the highest level among possible levels that can be set.

5. The method of claim 1, wherein in the setting step, the radio priority and the QoS of the transmission of the packets of the message are set based on a radio priority and a QoS set at a time of a Packet Data Protocol (PDP) context activation.

6. A method for transmitting packets of a message using a mobile terminal, the method comprising:
receiving, by a controller in the mobile terminal, a request for transmission of packets of data;
establishing, by the controller, communication and a radio priority and a QoS (Quality of Service) agreement in response to the request;
sending to a base station, by a transmission unit in the mobile terminal, the packets of data according to the agreed radio priority and QoS associated with the transmission of the packets of data;
receiving, by the controller, a request for transmission of packets of a message during the transmission of the packets of data;
setting, by the controller, a radio priority and a QoS associated with transmission of the packets of the message to a higher level than the agreed radio priority and QoS associated with the transmission of the packets of data such that packets of the message is sent prior to the packets of data; and
sending to a base station, by the transmission unit, the packets of the message prior to the packets of data according to the radio priority and the QoS associated with the transmission of the packets of the message and the transmission of the packets of data.

7. The method of claim 6, wherein the message is a SMS (Short Message Service), an EMS (Enhanced Message Service), or a MMS (Multimedia Message Service).

8. The method of claim 6, wherein the message is a message created by a user of the mobile terminal, or an acknowledgement message.

9. The method of claim 6, wherein the radio priority and the QoS of the packets of the message are set at at least one level higher than the agreed radio priority and QoS associated with the transmission of the packets of data.

10. The method of claim 6, wherein the radio priority and the QoS of the packets of the message are set at the highest level among possible levels that can be set.

11. A mobile terminal, comprising:
a transmission/reception unit; and
a controller which determines whether packets of data to be transmitted exist, sets in the mobile terminal a radio priority and a QoS (Quality of Service) associated with transmission of packets of a message to a level higher than a radio priority and a QoS associated with transmission of the packets of data based on a determination that the packets of data to be transmitted exist such that the packets of the message is transmitted before a transmission of the packets of data, and controls the transmission/reception unit so as to send the packets of the message and the packets of data according to the radio priority and the QoS to a base station.

12. The mobile terminal of claim 11, wherein the message is a SMS (Short Message Service), an EMS (Enhanced Message Service), or a MMS (Multimedia Message Service).

13. The mobile terminal of claim 11, wherein the message is a message created by a user of the mobile terminal, or an acknowledgement message.

14. The mobile terminal of claim 11, wherein the controller sets the radio priority and the QoS of the transmission of the packets of the message to at least one level higher than the radio priority and the QoS of the transmission of the packets of data in order to transmit the packets of the message first, or sets the radio priority and the QoS of the transmission of the packets of the message to the highest value among possible values that can be set.

15. The mobile terminal of claim 11, wherein the controller sets the radio priority and the QoS of the transmission of the packets of the message based on a radio priority and a QoS set at a time of a packet data protocol (PDP) context activation, so as to send the packets of the message first.

16. A mobile terminal, comprising:
a transmission/reception unit;
a buffer to temporarily store packets of a message and packets of data before being sent through the transmission/reception unit; and
a controller which determines whether the packets of data to be sent exist, sets in the mobile terminal a radio priority and a QoS associated with transmission of the packets of the message to a level higher than a radio priority and a QoS associated with transmission of the packets of data based on a determination that the packets of data to be transmitted exist in the buffer such that the packets of the message is transmitted first before the transmission of the packets of data in the buffer, and controls the transmission/reception unit and the buffer so as to send the packets of the message prior to the packets of data stored in the buffer according to the radio priority and the QoS associated with the transmission of the packets of the message and the transmission of the packets of data to a base station.

17. The mobile terminal of claim 16, wherein the message is a SMS (Short Message Service), an EMS (Enhanced Message Service), or a MMS (Multimedia Message Service).

18. The mobile terminal of claim 16, wherein the message is a message created by a user of the mobile terminal, or an acknowledgement message.

19. The mobile terminal of claim 16, wherein the controller sets the radio priority and the QoS associated with the transmission of the packets of the message to at least one level higher than the radio priority and the QoS associated with the transmission of the packets of data, or sets the radio priority and the QoS associated with the transmission of the packets of the message to the highest value among possible values that can be set.

20. The mobile terminal of claim 16, wherein the controller sets the radio priority and the QoS associated with the transmission of the packets of the message based on a radio priority and a QoS set at a time of a packet data protocol (PDP) context activation, so as to send the packets of the message first.

* * * * *